Feb. 21, 1967 J. LE ROY WERST 3,305,744

GANGED RING MAGNETS FOR COORDINATED CONTROL OF A PLURALITY OF BEAMS

Filed March 15, 1965 4 Sheets-Sheet 1

INVENTOR.
JOSEPH LEROY WERST
BY William H. Meagher
Attorney

INVENTOR.
JOSEPH LEROY WERST
BY
William H. Meagher
Attorney

INVENTOR.
JOSEPH LEROY WERST
BY
William H. Meagher
Attorney

INVENTOR.
JOSEPH LEROY WERST
BY
William H. Meagher
Attorney

United States Patent Office 3,305,744

Patented Feb. 21, 1967

3,305,744

GANGED RING MAGNETS FOR COORDINATED CONTROL OF A PLURALITY OF BEAMS

Joseph Le Roy Werst, Lancaster, Pa., assignor to Radio Corporation of America, a corporation of Delaware Filed Mar. 15, 1965, Ser. No. 439,602
5 Claims. (Cl. 313—77)

This invention relates generally to beam controlling devices, and, particularly, to devices suitable for providing so-called lateral correction effects to aid in the converging of the multiple beams of a multi-gun color image reproducing device.

A widely used form of color image reproducing device is the tri-gun, shadow-mask color kinescope. In operation of such a kinescope, it is intended that each of the beams produced by the three guns of the tube should selectively excite a particular set of phosphor dots luminescing in a particular primary color. To ensure that a particular beam selectively excites its assigned phosphor dots, the beam must approach the apertures of the shadow-mask that precedes the phosphor screen with the proper angle of approach. It is also important that the plurality of beams converge at the target to effect light production at coincident target regions. For such convergence purposes, there is conventionally associated with the tri-gun color kinescope a set of beam convergence magnets for effecting adjustment of the respective beam positions prior to their deflection.

Such beam convergence structures are usually called upon for both static and dynamic adjustments. The so-called static adjustments are made to ensure the establishment of the proper beam convergence at the center of the phosphor screen; the dynamic adjustments then serve to ensure maintenance of the proper convergence for the bundle of beams throughout their deflection from the center in the course of the raster scanning process.

To achieve the center-of-the-screen static beam convergence, it has proved convenient to provide individual adjustment magnets for each beam, each magnet being subject to manual adjustment to vary the position of the associated beam in a radial direction with respect to the kinescope axis. The guns of the conventional tri-gun, shadow-mask color kinescope are disposed in a triangular configuration within the kinescope neck; the triangle is conventionally oriented in such manner that the blue phosphor exciting gun is positioned along a radius which extends from the axis vertically (in terms of the normal display position of the phosphor screen). It will be appreciated that with such a positioning of the blue gun, adjustment of the blue beam position along a radius from the tube axis corresponds to adjustment of the blue beam in a vertical direction.

In order to provide ability to correct for all possible misconvergence errors, it is necessary to supplement the three individual beam adjustments in respective radial directions with a fourth adjustment parameter. It can readily be shown that if individual beam adjustments along respective radii are supplemented by beam adjustments in a direction at right angles to the radial direction of adjustment for a beam, all patterns of misconvergence at the center of the screen are amenable to correction.

It is convenient, and has become customary, to associate the required fourth beam position adjustment parameter with beam motion in a direction perpendicular to the radial adjustment direction of the blue beam; i.e., beam motion in a lateral or horizontal direction. While it is possible to limit the lateral adjustments to the blue beam only, a more efficient correcting system is provided where lateral adjustments of the blue beam position are accompanied by opposing lateral movements of the red and green beams. Reduction of the range of motion required of any one beam to achieve correction is advantageous in minimizing the introduction of beam distortion, or spot size growth, in the position correcting operation.

In a copending application of Richard H. Hughes, entitled "Magnetic Beam Deflection Arrangements," and filed concurrently herewith, a beam controlling device is disclosed employing magnet rings of a six-pole configuration; north and south poles alternate about the periphery of each magnet ring at 60° intervals. As discussed in detail in said Hughes application, use of a pair of such rings in juxtaposition, rotatably mounted about the neck of a color kinescope, provides a convenient facility for effecting a desired beam position correction; in some of the embodiments disclosed in the Hughes application, the form of correction obtained is tangential for all beams (providing a "twist" effect), while in other Hughes' embodiments the correction is of the previously discussed (mutually opposing) lateral-only type. By equal and opposite rotation of the juxtaposed rings through a 60° arc, correction may be adjusted through a range extending from maximum correction in one direction through a zero correction position to maximum correction in the opposite direction.

The present invention is directed to a novel and improved beam adjusting apparatus providing a facility for effecting lateral beam correction with magnet rings of the above-discussed six-pole variety. Mounting structures are associated with the magnet rings in such a manner as to ensure that rotation of one magnet ring will be accompanied by an equal and opposite rotation of the other magnet ring; the associated structure also limits the rotation of each magnet to an appropriate arcuate distance (e.g., 60°). The mounting structure further serves to establish the positions of the magnet poles relative to the beam positions such that vertical components of beam motion are minimized. The mounting structure further serves the purpose of securing the ring locations in the proper position along the length of the color kinescope neck.

In accordance with a particular embodiment of the present invention, the mounting structure associated with the six-pole magnet ring pair includes a pair of non-magnetic backing plates for the magnet rings; each of the backing plates is provided with an arcuate slot. The mounting structure also includes a neck mount structure, which includes a portion provided with a straight-edged, radially disposed slot. A floating pin extends through the radial slot of the neck mount, as well as through the (oppositely oriented) arcuate slots of the magnet ring backing plates. As a magnet ring is rotated (as by means of a tab on its backing plate) the floating pin riding in the three slots maintains proper orientation of the magnets and produces equal and opposite rotation thereof. The degree of permitted rotation is limited by the slot lengths.

In accordance with an alternative embodiment of the invention, the floating pin is associated with arcuate slots in extensions of the magnet rings themselves, whereby the backing plates may be eliminated.

A primary object of the present invention is to provide a novel and improved beam controlling device.

A particular object of the present invention is to provide novel structure facilitating the use of six-pole magnet rings to effect lateral beam position correction in a multi-gun color kinescope.

Other objects and advantages of the present invention will be readily recognized by those skilled in the art after a reading of the following detailed description and an inspection of the accompanying drawings, in which:

FIGURES 1*a*, 1*b* and 1*c* illustrate, in plan view, a lateral correcting device embodying the principles of the present invention in three positions of adjustment representing, respectively, maximum lateral correction in one direction, minimum correction and maximum lateral correction in the opposite direction;

Figure 1A:
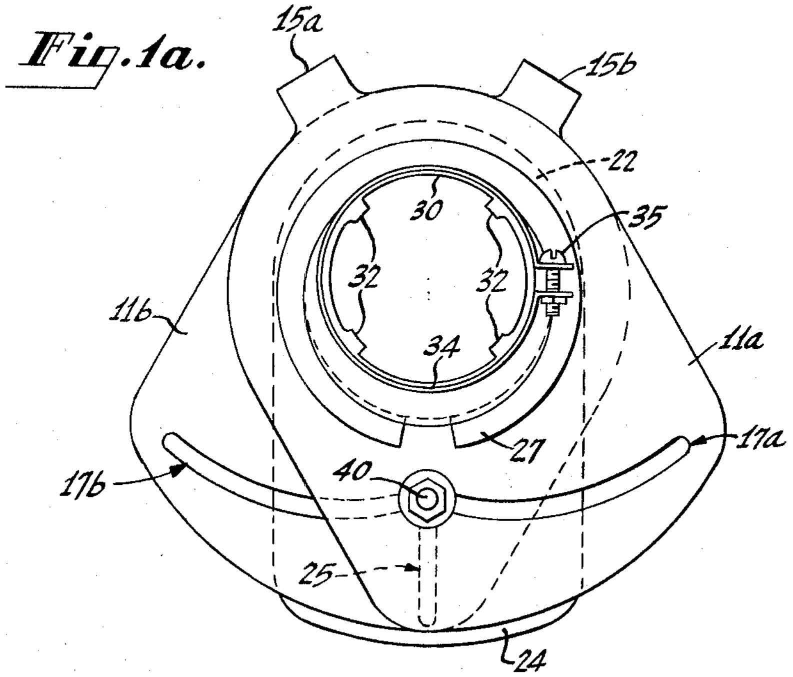
Figure 1B:
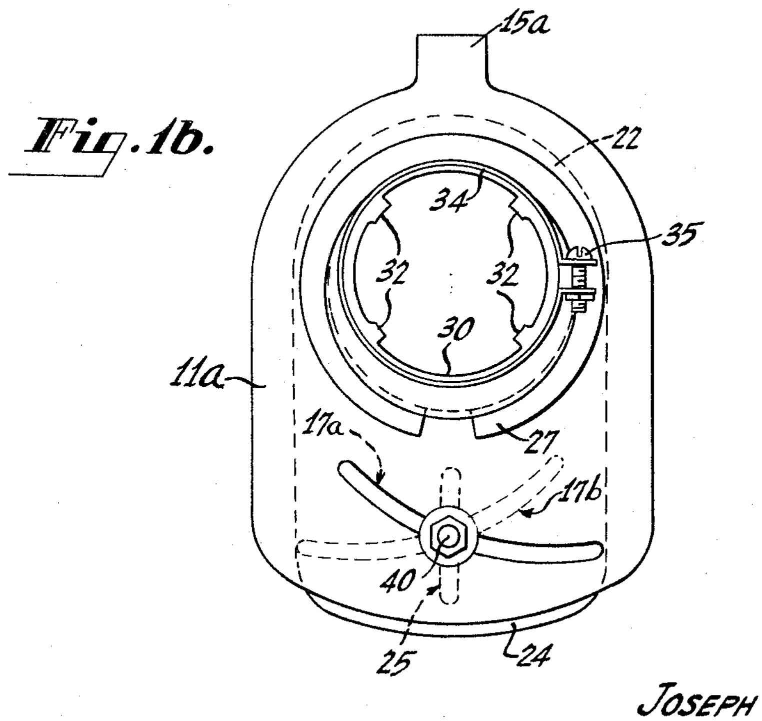
Figure 1C:
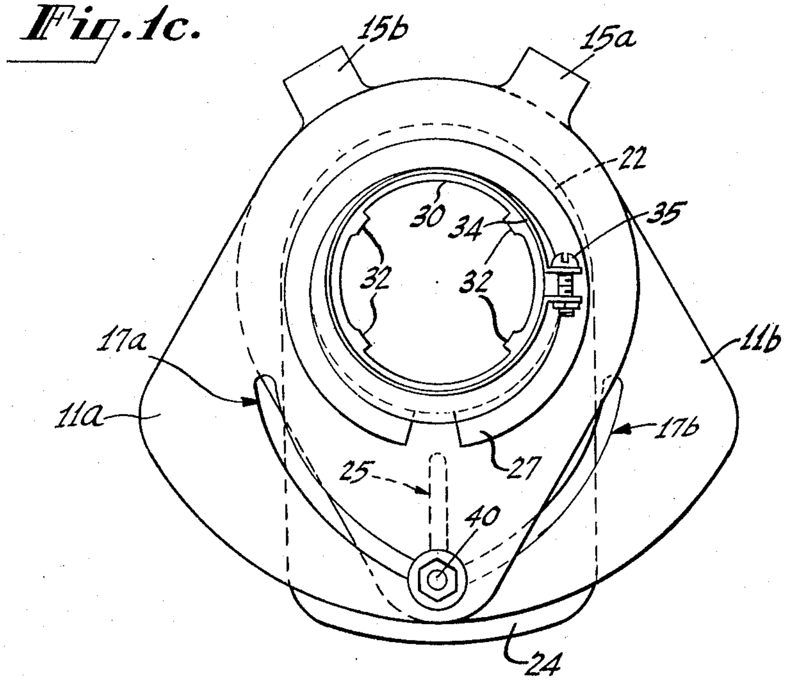
Figure 2:
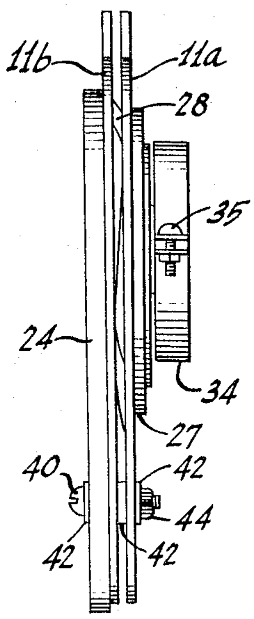
FIGURE 2 illustrates an edge view of the lateral correcting device of FIGURES 1*a*, 1*b* and 1*c*.

An assembled beam position correcting device in accordance with an embodiment of the present invention is illustrated in plan view, in several different positions of adjustments, in FIGURES 1*a*, 1*b* and 1*c*; a side or edge view of the device (in its FIGURE 1*b* position of adjustment) appears in FIGURE 2. The device includes a pair of identical magnet backing plates **11*a* and 11*b*** of non-magnetic material (e.g., linenized Bakelite).

Figure 3:
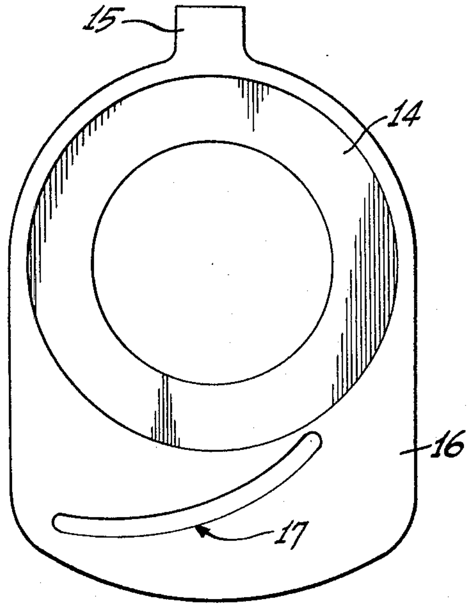
FIGURES 3 and 4 illustrate, in respective plan and edge views, a backing plate component of the structure of FIGURES 1*a*, 1*b*, 1*c* and 2.
Figure 4:
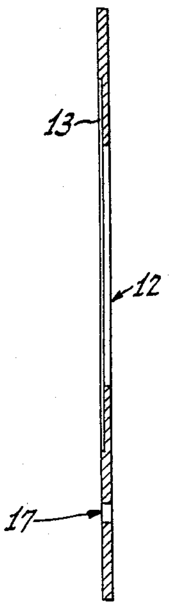

As shown more clearly in the plan and edge views of FIGURES 3 and 4, each backing plate has a circular aperture 12; an annular recess 13, surrounding the aperture 12, is dimensioned to receive a ring 14 of isotropic magnetic material, such as 1% carbon steel. The ring 14 is shown mounted in the recess 13 in the plan view of FIGURE 3 (but is not illustrated in the edge view of FIGURE 4). The backing plate periphery follows the contour of the supported magnet ring 14, with the exception of an outwardly projecting tab 15 in one peripheral region, and a diameter-wide projection 16 in the peripheral region diametrically opposed to tab 15. The projection 16 is pierced by an arcuate slot 17.

In the assembled device the backing plates **11*a* and 11*b* are juxtaposed with their apertures 12 concentrically disposed, and with the respective mounted magnet rings 14 facing each other. This results in opposite disposition of the respective slots 17*a* and 17*b***.

Figure 5:
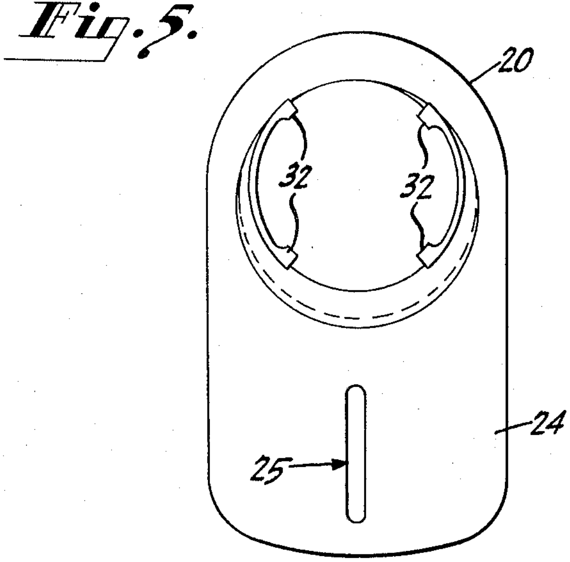
FIGURES 5 and 6 illustrate, in respect to plan and edge views, a neck mount component of the structure of FIGURES 1*a*, 1*b*, 1*c* and 2.
Figure 6:
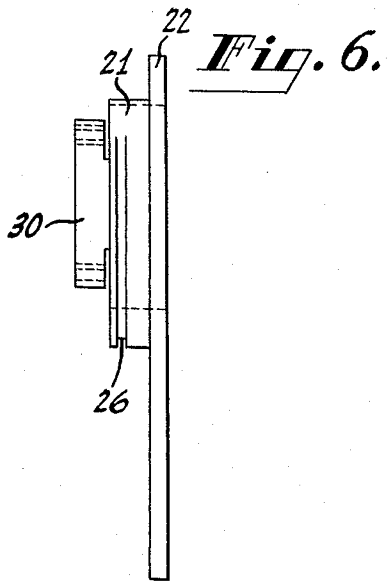

In the assembly, the backing plates **11*a* and 11*b* are rotatably supported on a generally cylindrical portion 21 of a neck mount element 20 (illustrated in respective plan and edge views in FIGURES 5 and 6). The neck mount element 20 may be constructed of a suitable non-magnetic material such as nylon. The outer surface of the cylindrical portion 21 is dimensioned so as to be received within the apertures 12 of the backing plates 11*a* and 11*b*. The fit is such as to permit rotation of the respective backing plates about the surface of cylindrical portion 21**.

A flat backing member 22 is provided at one end of the cylindrical portion 21. The backing member 22 follows the outer contour of the cylindrical portion 21 for half of its circumference, providing a shoulder against which the backing plate **11*b* rests. The backing member 22 is additionally provided with a generally rectangular extension 24; centrally positioned in the rectangular extension 24 is a straight-edged slot 25, disposed radially with respect to the axis of symmetry of the cylindrical portion 21. A recessed channel 26 extends about a portion of the periphery of the cylindrical portion 21, near its edge remote from the backing member 22. A retaining clip 27, of a resilient, split-ring form and constructed of a non-magnetic material such as linenized Bakelite, is received in the channel 26 to retain the backing plates 11*a* and 11*b* on the cylindrical portion 21. An annular spring shim 28 (slightly bent in alternately opposing directions at 60° intervals) is positioned about the cylindrical portion 21 in a position intermediate the opposing rings 14 of the respective backing plate assemblies. The spring shim 28 (made of spring temper Phosphor bronze, for example) tends to retain the respective backing plates 11*a* and 11*b* in mutually parallel positions perpendicular to the axis of symmetry of the cylindrical portion 21, and in abutment, respectively, with the retaining clip 27 and backing member 22. Frictional force between backing plates 11*a* and 11*b* and the retaining clip 27, backing member 22 and its projection 24 and spring shim 28 cause the backing plates 11*a* and 11*b*** to tend to remain in their adjusted positions.

At its end remote from the backing member 22 and extension 24, the cylindrical portion 21 of the neck mount 20 is provided with an extension 30 of cylindrical outer contour, positioned eccentrically with respect to the cylindrical surface of portion 21. The inner surface of extension 30 is provided, at 90° intervals about its periphery, with inwardly projecting ridges 32. The surfaces of ridges 32 lie along respective arcs of a circle which has as its center the axis of symmetry of the cylindrical extension 30, and which has a diameter substantially corresponding to the diameter of the outer surface of the neck portion of the color kinescope upon which the correcting device is to be mounted. An adjustable neck clamp ring 34 surrounds the cylindrical extension 30. The clamp 34 (which may be made of such non-magnetic material as brass or Phosphor bronze) is of a familiar split-ring form, with upturned ends apertured to receive an adjusting screw 35. When mounted on a kinescope neck, tightening of a screw 35 contacts the ring 34, tightening the grip of ridges 32 on the tube neck to secure the correcting device in a desired position.

The respective rotatable backing plates **11*a* and 11*b* and the backing member 22 of neck mount 20 are linked by means of a floating pin technique. Illustratively, the floating pin comprises a screw 40 which extends through each of the slots 17*a*, 17*b* and 25. Three washers 42 surround the screw 40, one between the screw head and the outer surface of backing member 22, one between the adjacent surfaces of the respective backing plates 11*a* and 11*b* and the third between the outer surface of backing plate 11*a* and a hexagonal nut 44 threaded on the end of screw 40. The nut 44 is tightened sufficiently to retain the screw 40, and yet allow free movement of the screw 40 in each of the respective slots. The end of screw 40 may then be peened into the threads of nut 44 to prevent loosening. As an alternative to the illustrated screw 40**, the floating pin may take over well-known forms such as an eyelet or a rivet.

The floating pin linkage ensures that any rotation of either of the backing plates **11*a*, 11*b* will be accompanied by an equal and opposite rotation of the other. The dimensions of the respective slots 17*a*, 17*b* and 25** are chosen so that the degree of rotation permitted to each backing plate constitutes a 60° arc.

Figures 7, 8:
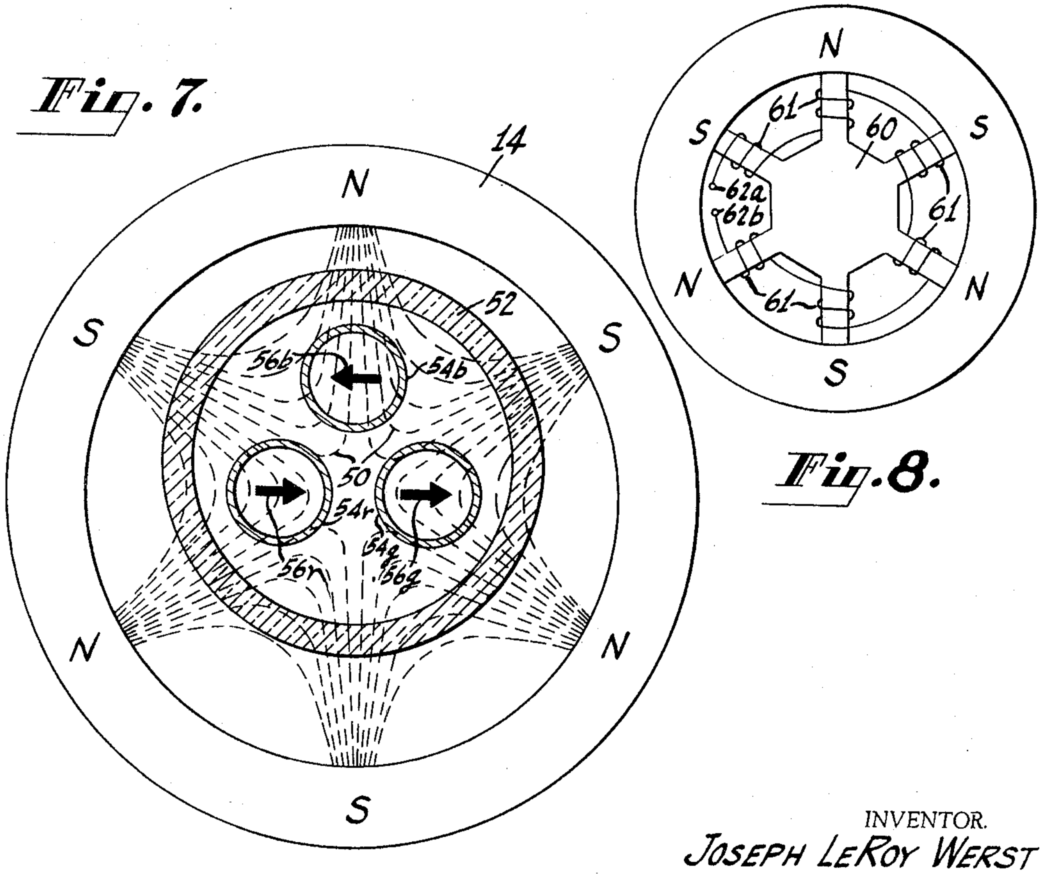
FIGURE 7 illustrates the magnetic flux pattern associated with the six-pole magnet ring of the lateral correcting device, and the effect thereof on beam positions.
FIGURE 8 illustrates one form of structure that may be employed in providing the desired six-pole magnetization for the magnet rings of the lateral correcting device.

Each of the magnet rings 14 of the correcting device is magnetized with a symmetrical, six-pole magnetic configuration, as indicated in FIGURE 7. The flux pattern associated with such magnetization is shown by the dotted lines 50. In FIGURE 7, the magnet ring 14 is shown in operating position, eccentrically surrounding the neck portion 52 of a tri-gun color kinescope; the degree of eccentricity is such that the lateral center line of the ring substantially coincides with the lateral center line of the red and green electron gun electrodes. Details of the mount structure previously described which provides such eccentric positioning have been omitted from FIGURE 7 so as to more clearly illustrate the flux pattern. In a preferred position for the correcting device along the length of the tube neck, the magnet rings 14 are located around portions of the respective cylinders that serve as the focusing electrodes of the respective electron guns.

of the color kinescope. Such electrodes appear, in cross section, as cylinders 54_b_, 54_g_ and 54_r_ in FIGURE 7.

In the particular position of rotational adjustment of ring 14 represented in FIGURE 7, a north pole of the ring is positioned directly above the blue gun electrode 54_b_. The magnetic flux passing through the central region of the hollow interior of electrode 54_b_ is downwardly directed. In contrast, the flux passing through the central region of the hollow interiors of electrodes 54_r_ and 54_g_, respectively, is upwardly directed.

In the rotational position illustrated in FIGURE 7 the flux influencing the blue beam within electrode 54_b_ has substantially no horizontal component, whereby the beam movement produced thereby is a lateral deflection, as illustrated by arrow 56_b_. By virtue of the eccentric disposal of the ring 14, the flux influencing the red and green beams, respectively, is also substantially free of horizontal components (as discussed in more detail in the copending application of Jerrold K. Kratz, entitled, "Beam Position Adjusting Device," and concurrently filed herewith), whereby the red and green beam movements produced are also of a lateral deflection character. However, due to the opposite poling of these latter fields relative to the field within blue gun electrode 54_b_, the red and green beam movements, as indicated by arrows 56_r_ and 56_g_, are in a direction opposite to the direction of the blue beam movement. The red and green beam movements are of lesser magnitude than the blue beam movement; this results from the eccentric disposal of ring 14, which renders the flux path length greater in the case of flux lines traversing the interior of electrodes 54_r_ and 54_g_ than in the case of the flux lines traversing the interior of electrode 54_b_.

In use of the subject correcting device, the rotational position illustrated in FIGURE 7 for a magnet ring 14 would be coincident with the rotational position of a second, adjacent magnet ring. The fields of the two magnet rings would directly reinforce, and the result would be maximum lateral deflection of the blue beam in the direction illustrated by arrow 56_b_. Such a position of the rings, and their associated backing plates 11_a_ and 11_b_, is illustrated in FIGURE 1_a_. In this extreme of adjustment, the tab 15_a_ of backing plate 11_a_ is shifted 30° in a first direction from a vertically aligned position, while the tab 15_b_ of backing plate 11_b_ is shifted 30° from a vertically aligned position in a second direction opposite to the first. In this adjustment position, the floating pin 40 is at the uppermost extremity of each of the slots 17_a_, 17_b_ and 25.

The opposite adjustment extreme is illustrated in FIGURE 1_c_, where the floating pin 40 is at the downwardmost extremity of each of slots 17_a_, 17_b_ and 25. In adjustment from the FIGURE 1_a_ position to the FIGURE 1_c_ position, the respective tabs 15 of the backing plates 11_a_ and 11_b_ travel a 60° arc in opposite directions to mutually exchanged positions 30° displaced from a vertically aligned position. As will be appreciated from FIGURE 7, a 60° rotation of each magnet ring 14 will bring a south pole of each ring to a position directly above the blue gun electrode 54_b_. The shape of the flux line pattern will be as illustrated in FIGURE 7, but the poling will be the opposite to that shown. As a result the beam deflections will in each case be opposite to that shown by the illustrated arrows. The respective fields within each of the cylinders 54_b_, 54_r_ and 54_g_ will be substantially free of any horizontal component, and will thus provide maximum lateral deflection of a character opposed to that shown in FIGURE 7.

FIGURE 1_b_ illustrates the half-way point of rotational adjustment, where the tabs 15 of each backing plate are in a vertically aligned position, and the floating pin 40 is at an intermediate point in each of the slots 17_a_, 17_b_ and 25. In this half-way position, representing a 30° rotational shift in a first direction for one magnet ring 14 (relative to the position illustrated in FIGURE 7) and an opposite-direction rotational shift of 30° for the adjacent ring, substantially no deflection of the beams is produced. In this position each north pole of one ring is directly adjacent to a south pole of the adjacent ring, and vice versa. When opposite magnetic poles of the adjacent rings thus coincide, each magnet ring acts as a shunt for the other; nearly all the magnetic flux is confined to the air gap between the magnet rings and to the magnet material itself. Only very weak leakage fields from each magnet ring will be present in the ring apertures; these fields will be oppositely directed, and will therefore mutually cancel.

In rotational positions of the correcting device intermediate the extreme of FIGURE 1_a_ and the half-way position of FIGURE 1_b_, the net fields developed within the respective cylinders remain vertically oriented, but are of lesser and lesser magnitudes as the half-way position is approached. The reduction in magnetic field strength as the half-way position is approached is caused by two phenomena: (1) As opposite polarity poles approach each other, the length of the air gap between (adjacent ring) poles of opposite polarity becomes less, thereby reducing the leakage flux fields in the apertures of the rings. (2) As the poles move away from the maximum deflection position, the ratio of horizontal to vertical flux components increases for each ring; however, the horizontal components for the respective rings are oppositely directed, and thus mutually cancel. The net vertical component for each electrode field accordingly lessens toward a minimum at the half-way position. The reverse of the above-described action occurs in the shift from the half-way position of FIGURE 1_b_ to the extreme of FIGURE 1_c_, producing an increasing net vertical component as the extreme of FIGURE 1_c_ is approached.

The movements of floating pin 40 in its guiding slots 17_a_, 17_b_ and 25 ensures that every rotational adjustment of one magnet ring 14 will always be accompanied by an equal and opposite rotational adjustment of the adjacent magnet ring, whereby the desired horizontal field component cancellation effect will always be maintained. The slot lengths are chosen so that the permitted rotational adjustment of each ring is limited to a 60° arc, the degree of rotational travel required to move from one deflection extreme to the opposite deflection extreme.

FIGURE 8 shows one form of magnetizing apparatus that may be employed to obtain the desired six-pole magnetization of each magnet ring 14. The magnetizer comprises a spoked core 60. The core 60 is hexagonally shaped, with six spoke-like projections from each hexagon corner. A magnetizing winding 61 is wound about each of the spokes, with the winding direction alternating on successive spokes about the core periphery. The windings are connected in series between energizing terminals 62_a_ and 62_b_. A suitable energy source (such as a capacity discharge device) is connected between terminals 62_a_ and 62_b_ to cause a high value of current to traverse the magnetizing windings, to produce the desired six-pole configuration in a pair of magnet rings positioned about the outer periphery of the core spokes. Illustratively, the spoked hexagonal core 60 may be of laminated form, built up from lamina of suitable magnetically soft material of high permeability (such as silicon steel).

Figure 9:
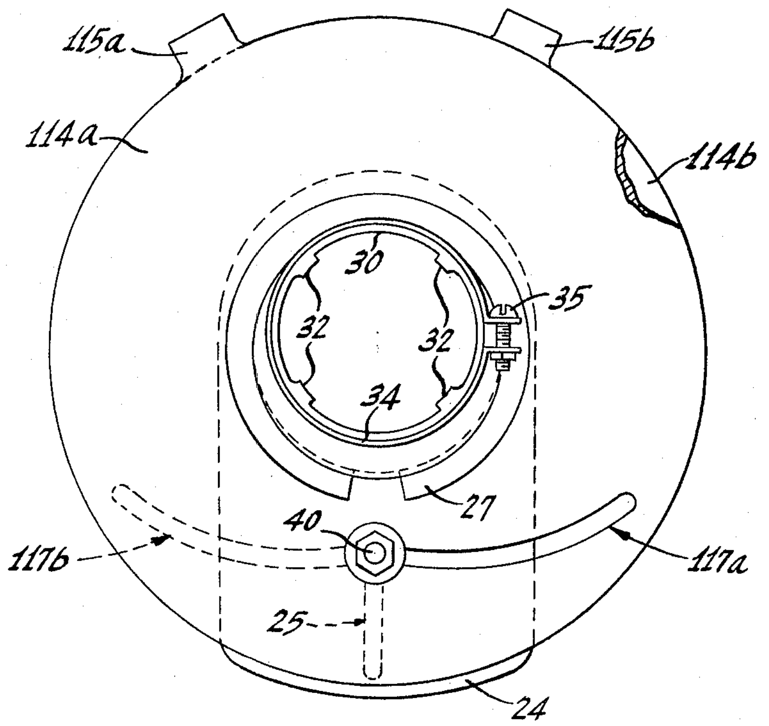
FIGURE 9 illustrates a plan view of a lateral correcting device in accordance with a modification of the invention embodiment ef FIGURES 1*a*, 1*b*, 1*c* and 2.

FIGURE 9 illustrates a modification of the correcting device heretofore described in accordance with a further embodiment of the present invention. In the FIGURE 9 modification, the slotted, magnet-supporting backing plates are eliminated, the magnet rings are enlarged and slots are provided in the enlarged magnet rings themselves to allow use of the previously discussed floating pin linkage arrangement.

In the illustrated modification, the same neck mount structure is used as was described in connection with the previous figures; accordingly, the same reference numerals are employed therefor. A pair of large six-pole magnetic rings 114_a_ and 114_b_ are mounted for rotation on the outer surface of the cylindrical portion of the neck mount 20. The rings 114a and 114b are provided with respective tabs 115a and 115b for manual rotational adjustment of the rings. The rings are additionally provided with respective arcuate slots 117a and 117b; the rings are sufficiently large as to enable location of the slots in the same relation to the slot 25 of the neck mount extension 24 as were the slots 17a and 17b of the backing plates of the previously discussed embodiment. Floating pin 40 serves the same linkage function as previously described, extending through each of the respective slots 117a, 117b and 25.

Operation of the FIGURE 9 embodiment is the same as for the previously discussed embodiment. Beam correction may be varied from one extreme of lateral deflection (attained at the position of adjustment specifically illustrated in FIGURE 9) to an extreme of lateral deflection in the opposite direction by rotation of the respective rings 114a and 114b through 60° arcs in mutually opposite directions. The movements of floating pin 40 in the respective slots 117a, 117b and 25 assures that each rotational adjustment of a ring will be accompanied by an equal and opposite rotation of the adjacent ring.

What is claimed is:

1. An adjustable beam position corrector, comprising the combination of:

a mounting structure having a generally cylindrical aperture and including a portion having a cylindrical outer surface eccentrically disposed with respect to said cylindrical aperture;

a pair of magnetic field producing means, each comprising a magnet ring having a central aperture dimensioned to receive the cylindrical outer surface of said mounting structure, said rings being rotatably supported on said surface, the magnetization of each of said rings being such as to provide each ring with a set of six poles symmetrically located along the ring circumference and alternating in polarity along said circumference;

and means providing a floating pin linkage between said pair of magnetic field producing means and said mounting structure for ensuring that any rotational adjustment of any one ring of said pair will be accompanied by a rotational adjustment of the other ring of said pair of equal extent but of opposite rotational direction.

2. A lateral correcting device for a multibeam color kinescope, comprising the combination of:

a pair of ring magnets each provided with a pattern of six alternating poles located symmetrically along the ring circumference;

a support for each of said ring magnets, each of said supports having an aperture bounded by a circle and retaining the associated ring magnet in a position concentric with said circle, each of said supports further being provided with a projection extending beyond the ring magnet retention position, said projection being pierced by an arcuate slot, one extremity of said arcuate slot extending closer to said ring magnet retention position than the other extremity;

neck mount structure having a cylindrical aperture dimensioned to receive a kinescope neck, said neck mount structure including a cylindrical portion having an outer surface eccentrically disposed with relation to said neck receiving aperture, and said neck mount structure additionally being provided with a projection extending beyond said cylindrical portion outer surface, said projection being pierced by a straight-edged slot extending radially with respect to the center of said neck receiving aperture;

said ring magnet supports being rotatably mounted in adjacent positions on the outer surface of the cylindrical portion of said neck mount structure, said ring supports facing in mutually opposite directions whereby said one slot extremity of one support and said one slot extremity of the other support are oppositely disposed with respect to said radial slot of said neck mount structure;

and means including a pin extending through each of said arcuate slots and said radial slot for providing a floating pin linkage between said magnet supports and said neck mount structure so that rotational adjustment of the position of one ring magnet is accompanied by an equal and opposite rotational adjustment of the position of the other ring magnet.

3. In combination with a multibeam color kinescope having a neck enclosing a plurality of electron guns, an adjustable beam position corrector, comprising the combination of:

a neck mount having a generally cylindrical aperture and including a first portion having a cylindrical outer surface eccentrically disposed with respect to said cylindrical aperture, and a second flat portion, said kinescope neck extending through said aperture with said neck mount retained on said neck such that said cylindrical outer surface eccentrically encircles said plurality of electron guns;

a pair of magnet rings supported for rotation about said surface, the magnetization of each of said rings being such as to provide each ring with a set of six poles symmetrically located along the ring circumference and alternating in polarity along said circumference;

and means providing a floating pin linkage between said rotatably supported rings and said flat portion of said neck mount for causing any rotational adjustment of any one ring of said pair to be accompanied by an equal and opposite rotational adjustment of the other ring of said pair.

4. In combination with a tri-gun color kinescope, a lateral beam shifting device, comprising the combination of:

a pair of ring magnets each provided with a magnetization pattern comprising six poles located symmetrically along the ring circumference and alternating in polarity along said circumference;

a support for each of said ring magnets, each of said supports having a circular aperture and retaining the associated ring magnet in a region concentrically further being provided with a projection extending beyond the ring magnet retention region, said projection being pierced by an arcuate slot, one extremity of said arcuate slot extending closer to said ring magnet retention region than the other extremity;

neck mount structure having a cylindrical aperture receiving said kinescope neck, said neck mount structure including a cylindrical portion having an outer surface eccentrically disposed with relation to said neck receiving aperture, and said neck mount structure additionally being provided with a flat projection extending beyond said cylindrical portion outer surface, said projection being pierced by a straight-edged slot extending radially with respect to the center of said neck receiving aperture;

said ring magnet supports being rotatably mounted in adjacent positions on the outer surface of the cylindrical portion of said neck mount structure, said ring supports facing in mutually opposite directions so that said one slot extremity of one support and said one slot extremity of the other support are oppositely disposed with respect to said radial slot of said neck mount structure;

and means including a pin extending through each of said arcuate slots and said radial slot for providing a floating pin linkage between said magnet supports and said neck mount structure so that rotational adjustment of the position of one ring magnet is accompanied by an equal and opposite rotational adjustment of the position of the other ring magnet.

5. In combination with a multibeam color kinescope having a cylindrical neck, an adjustable magnetic beam deflector, comprising the combination of:

a neck mount having a generally cylindrical aperture receiving said kinescope neck, and including a first portion having a cylindrical outer surface eccentrically disposed with respect to said received kinescope neck, and a second flat portion;

a pair of magnet rings, the magnetization of each of said rings being such as to provide each ring with a set of six poles symmetrically located along the ring circumference and alternating in polarity along said circumference;

means for individually supporting each of said rings for concentric rotation about said cylindrical outer surface of said neck mount;

and means providing a floating pin linkage between the respective ring supporting means and said flat portion of said neck mount for causing any rotational adjustment of any one ring of said pair to be accompanied by an equal and opposite rotational adjustment of the other ring of said pair.

No references cited.

JAMES W. LAWRENCE, *Primary Examiner.*

R. SEGAL, *Assistant Examiner.*